United States Patent [19]

Lifshitz

[11] 4,362,497
[45] Dec. 7, 1982

[54] FOOD PRESS FORM

[76] Inventor: Igor Lifshitz, 1635 N. Martel Ave., Los Angeles, Calif. 90036

[21] Appl. No.: 293,513

[22] Filed: Aug. 14, 1981

[51] Int. Cl.³ .......................... A21C 11/10; B29C 1/00
[52] U.S. Cl. ...................................... 425/510; 249/69; 249/76; 249/119; 249/120; 249/129; 249/132; 249/134; 425/292; 425/298; 425/306; 425/310; 425/324.1; 425/383
[58] Field of Search ............... 425/510, 512, 306, 310, 425/324.1, 383, 292, 298, 300; 249/66 R, 69, 76, 119, 120, 129, 132; 426/283, 176

[56] References Cited

U.S. PATENT DOCUMENTS

| | | | |
|---|---|---|---|
| 1,964,476 | 6/1934 | Newman | 249/120 |
| 2,138,247 | 11/1938 | Tatosian | 426/283 |
| 2,386,993 | 10/1945 | Valdastri | 426/283 |
| 3,234,895 | 2/1966 | Leiby | 426/503 |
| 3,431,601 | 3/1969 | Lipscomb | 249/120 |
| 3,475,521 | 10/1969 | Stroop | 264/153 |

FOREIGN PATENT DOCUMENTS

| | | | |
|---|---|---|---|
| 508456 | 1/1955 | Italy | 99/450.6 |
| 160607 | 3/1921 | United Kingdom | 249/76 |

Primary Examiner—Willard E. Hoag
Attorney, Agent, or Firm—Erik M. Arnhem

[57] ABSTRACT

Food products are processed prior to consumption in a press form having multiple, separate, pre-selected planar food product molds, each having tapered walls, providing easy food product removal. The food products can have pastry dough exteriors and can be filled with selected food fillings held in position and shaped by dough crust exteriors. Multiple press form food product molds have regular planar shapes disposed multiple in a tray. One face of each product mold has a cutting-edge knife disposed thereon, conforming to the mold interior shape. The cutting-edge knife can be disposed at either mold wall taper terminus. A cooperatively shaped, one-piece negative pusher plug mold, sized to intercept each one of the multiple food product molds disposed in the tray, is used to cooperatively push each food product out of the molds in the tray simultaneously. Additional, easily insertable and removable partitions of single and double cross-wise edge-knife units can be disposed in the molds, further dividing the food products.

8 Claims, 10 Drawing Figures

FOOD PRESS FORM

BACKGROUND OF THE INVENTION

The food press form of this invention is classified in class 107, subclasses 27, 54, 58 and the like, and was disclosed by the inventor in the U.S. Patent and Trademark Office Sept. 29, 1980 under disclosure document No. 94347.

In U.S. Pat. No. 3,234,895 issued Feb. 15, 1966, Leiby discloses a means for preparing dough for cooking, such as by the separation of a dough mass with identical pieces of substantially the same weight, as doughnuts, buns, biscuits and the like, and including a sheeter for dough, and a cast unitary cutter divider.

Valdastri, Sr., in U.S. Pat. No. 2,386,993, issued Oct. 16, 1945, disclosed a method and apparatus for making ravioli, comprising a flat frame having a plurality of molds.

Tatosian, in U.S. Pat. No. 2,133,247, issued Nov. 25, 1938, disclosed a mold or die for baking pies and the like. The mold had a pie base and a hinged cover for the pie, forming a chamber there between, together with a die locking means.

SUMMARY OF THE INVENTION

Food products are processed prior to consumption by humans in a new press form having multiple, separate, pre-selected regular planar food product molds. Each food product mold has typically a round, square, rectangular, triangular, hexagonal or the like planar mold configuration, with internal tapered mold walls providing for easy removal of the cooked food products. A top face of each mold has a cutting-edge knife terminus and pasting face thereon, configured around the mold edge adjacent to one tapered wall terminus. The tapered wall of the mold can provide a mold base smaller in cross-section or larger in cross-section than the top face of the mold, dependent on the tapered slope of the mold wall. Multiple food product molds are nested in a tray, prior to filling the mold with food product.

The food product can typically have a first raw dough crust sheet laid over the multiple molds nested in the tray, and then pushed down into and conforming with the internal volume of each food mold. The first dough crust can then be filled with another mix of food as a filling, and covered with a second raw dough crust sheet.

The human cook can then use the cook's hands or a rolling pin to press the first and second raw crusts together, bonding the two crusts and cutting them into the nested pattern of the cutting-edge knife termini surrounding the top perimeter of each of the nested molds in the tray. Residual raw dough crust sheet may be removed from the top of the multiple nested molds, if desired.

Further, a cooperatively shaped, one-piece negative pusher plug mold, sized and shaped to intercept each one of the multiple food product molds nested in the tray, can be disposed on the bottom face of the molds, overturned with the cooked food products, pushing all of the cooked food products out of the multiple molds simultaneously. It would also be possible to release the food products by simply placing the molds nested in the tray over the pusher plug mold, thereby forcing the food products out of the molds.

Included in the objects of this invention are:

To provide for making dough products with various food fillings in domestic and public places, with large output only for one time usage, excluding hand labor in cutting, pasting and forming of dough.

To provide for making food products with various fillings, easily providing an operator the possibility of making different shaped food forms.

To provide additional easy insertable and removable partitions of a single and double cross-wise units adjusted for cutting, pasting, and forming food products in each mold section.

To provide a cooperatively shaped one-piece, negative pusher plug mold, shaped and sized to concurrently intercept each one of the multiple food product molds disposed in the tray.

Other objects and advantages of this invention are taught in the following description and claims.

BRIEF DESCRIPTION OF THE DRAWINGS

The description of this invention is to be read in conjunction with the following drawings:

FIG. 4 is a view of FIG. 2 in cooperational view of the one piece pusher plug, sized to intercept each one of the food product molds of FIG. 2 and the like.

DESCRIPTION OF THE PREFERRED EMBODIMENT OF THE INVENTION

Figure 1:
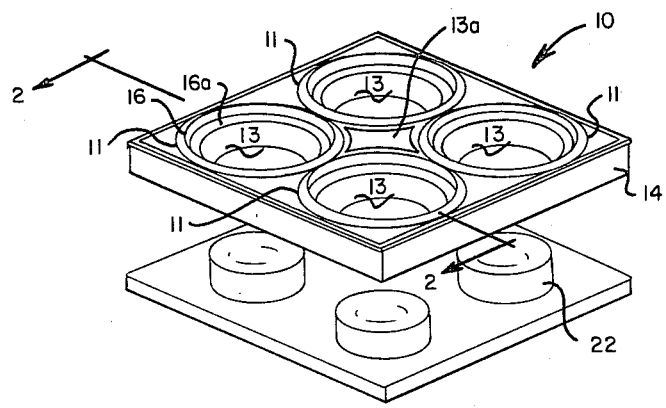
FIG. 1 is a perspective elevational view of one of the multiple food product molds of this invention, disposed in a tray, and a one piece pusher plug mold coacting therewith.
Figure 2:
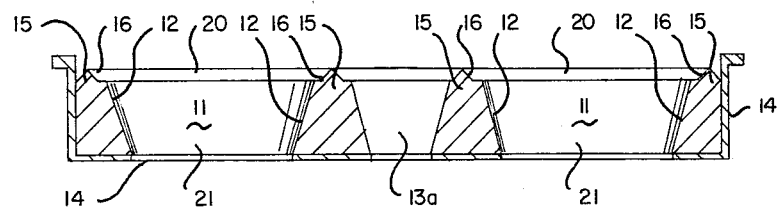
FIG. 2 is a sectional view through 2—2 of FIG. 1.

Selected food products are processed prior to human consumption in a new press form 10 of FIG. 1, having multiple, separate, pre-selected regular planar food product molds 11. Each food product mold 11 has typically a round, square, rectangular, triangular, hexagonal or the like planar mold configuration 13, the round configuration 13 being illustrated in FIG. 1. The tapered walls 12 of molds 11 as shown in FIG. 2, provide for easy removal of the cooked food products from the molds 11. The planar regular mold shapes 13 of the molds 11 provide easy assembly and close positioning of molds 11 appropriately sized apertures in the hold tray 14. However, in aligning circular molds 13 in the tray, a substantially diamond shaped space 13a is created (FIG. 1) which may be utilized as an additional food product mold, thus attaining maximal use of the dough sheets and fillings applied to the mold surfaces 13. Naturally, square or rectangular planar mold configurations provide a most efficient utilization of tray 14 volume. The top face 15 of each mold 11 has a cutting-edge knife terminus 16 thereon, configured around the face 15.

Figure 3:
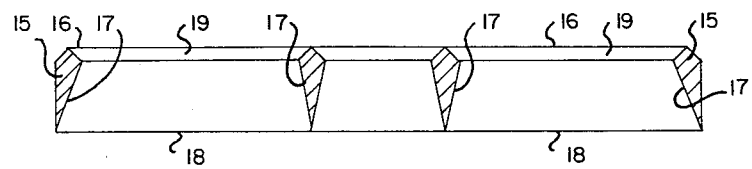
FIG. 3 is a further modification of FIG. 2 in another sectional view.

Referring to FIG. 3 there is illustrated a mold 11 having a reverse mold wall taper 17, compared to tapered wall 12 of FIG. 2. The reverse mold wall taper 17 is characterized by having a base internal cross section 18 larger in area than the top internal cross section area 19. The tapered wall 12 of FIG. 2 is characterized by having a top cross section area 20 larger in area than the base cross section area 21. The multiple molds 11 and the like regular configurations can be closely nested in tray 14 as required, prior to filling the molds 11 with selected food product.

As clearly appears in FIGS. 2 and 3, molds 11 are open at the bottom or as otherwise herein expressed the molds have no bottom or "base wall". As a result the molds can cooperate with pusher member 22 as is shown in FIG. 4.

The food product can typically have a first raw dough crust sheet laid over the assembled press form 10, and the sheet pushed down into the molds 11 nested in tray 14, conforming with the internal volume of molds 11. The first dough crust can then be filled with another mix of food as a filling, and covered with a second raw dough crust sheet. The human cook can then use the cook's hands or a rolling pin to press the first and second crusts together, bonding the two crusts and cutting them into the nested pattern of the cutting-edge knife termini 16 surrounding the top perimeter face 15 of each of the nested molds 11 in tray 14. If desired, the residual raw dough crust can be removed from the top of the nested multiple molds 11.

Figure 4:
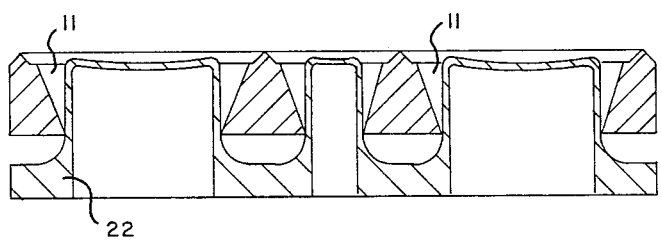

Further, in FIGS. 2 and 4 a cooperatively shaped and sized one-piece negative pusher plug 22 is illustrated in cooperating pusher position relative mold 11 of FIGS. 1 and 2, effectively loosening and removing cooked food product from molds 11.

Figure 5A:
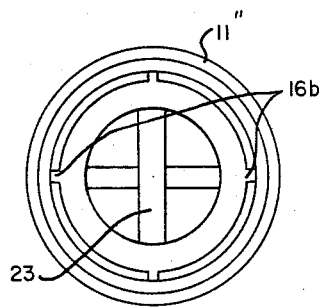
FIG. 5 (a) and (b) is a reverse and top plan view of a single mold having a cross cutting-edge knife and partition disposed in the mold.
Figure 5B:
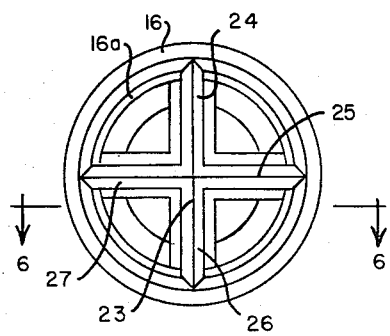

Referring to FIG. 5 in detail, FIG. 5 (*a*) illustrates a plan view of the base of a replicate mold 11″ of the original mold 11 having a cross insert removable partition 23 disposed in mold 11″. FIG. 5 (*b*) illustrated the top plan view of partition 23, which divides the mold cavity into four quadrants having four cutting-edge knife termini 24, 25, 26, 27, in addition to cutting edge terminus 16 and pasting face 16*a*.

Figure 6A:
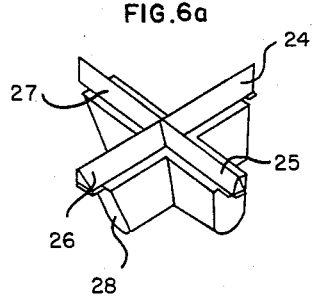
FIG. 6 (a) and (b) is a perspective elevational view (a) of the cutting-edge knife and partition of FIG. 5, and a cross section view thereof (b).
Figure 6B:
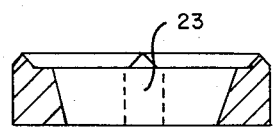

FIG. 6 (*a*) illustrated the cross insert partition 23 in isolated elevational perspective, tapered at 28 to fit into the tapered wall 12 of mold 11″. Optionally, one may provide mold 11 with indentations or slots 16 (*b*) in pasting face 16 (*a*), as indicated in FIG. 5 (*b*), within which tapered walls 28 of partition 23 may be accommodated. FIG. 6 (*b*) illustrates the section through 6—6 of FIG. 5 (*b*).

Figure 7A:
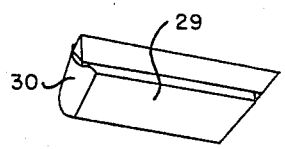
FIG. 7 (a) is a perspective elevational view of a single cutting-edge knife, and (b) is the knife disposed in a mold.
Figure 7B:
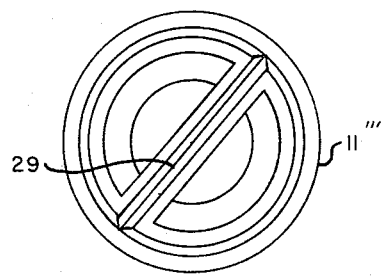

FIG. 7 (*a*) and (*b*) illustrate a single partition 29 disposed in a mold 11‴ having tapered partition riser 30.

The molds 11 of this invention can range in size from 2 to 14 cm across, and typically 2 to 4 cm in depth. The tray 14 is sized and shaped to accommodate the multiple molds 11, of the desired mold 11 planar shape. The materials of construction of molds 11 and tray 14 can be steel, aluminum, copper and the like metals. Selected plastic compositions, resistant to heat distortion at an oven temperature up to 400° F. can also be used. The plastic compositions can be colored. Plastic coatings known to easily release hot food can also be applied to the metal form interiors.

Many modifications in the food press form can be made in the light of my teachings. It is understood that within the scope of the claims, the invention can be practiced otherwise than as described.

I claim:

1. A food form in combination, comprising:
   multiple separate, planar food product molds each having a shape appearing in plan view as a regular planar geometric figure, each mold having tapered mold walls and being free of a base wall, each mold having a top face and a cutting-edge knife edge terminus disposed around said top face, conforming to said shape, a holding tray shaped and sized to hold and secure said multiple food product molds in said tray, and,
   a one-piece pusher member having plural projections each being sized and shaped to cooperate with one of said multiple molds and to be intruded into one of said molds and to eject the molded food product therefrom.

2. The food press form of claim 1 further including an easily insertable and removable partition having a cooperative cutting-edge knife disposed on the entire top face of said partition, and having a tapered partition wall coterminous with a tapered adjacent mold wall.

3. The food press form of claim 1 wherein said figure is a regular rectangle.

4. The food press form of claim 1 wherein said figure is square.

5. The food press form of claim 1, wherein said figure is a triangle.

6. The food press form of claim 1, wherein said figure is a circle.

7. A food press form in combination, comprising:
   multiple, separate, planar food product molds each having a shape appearing in plan view as a regular planar geometric figure, each mold having tapered mold walls and an open bottom, each mold having a top face and a cutting-edge knife edge terminus disposed around said top face, conforming to said shape, and
   a holding tray shaped and sized to closely hold and secure said multiple food product molds in said tray.

8. A food press form as in claim 7, including an easily insertable and removable partition having a cooperative cutting-edge knife disposed on an entire top face of said partition, and having a tapered partition wall.

* * * * *